United States Patent Office 3,178,792
Patented Apr. 20, 1965

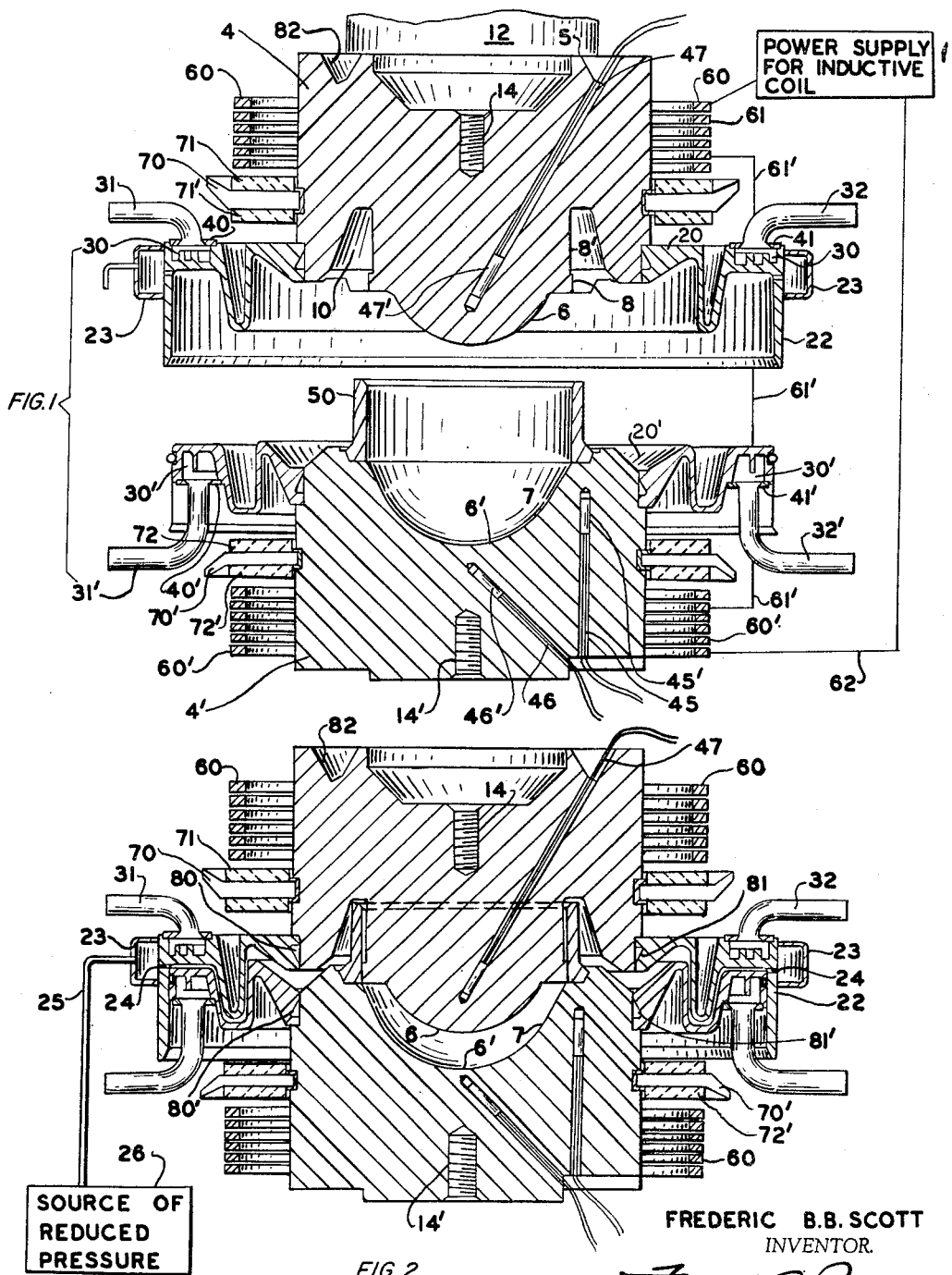

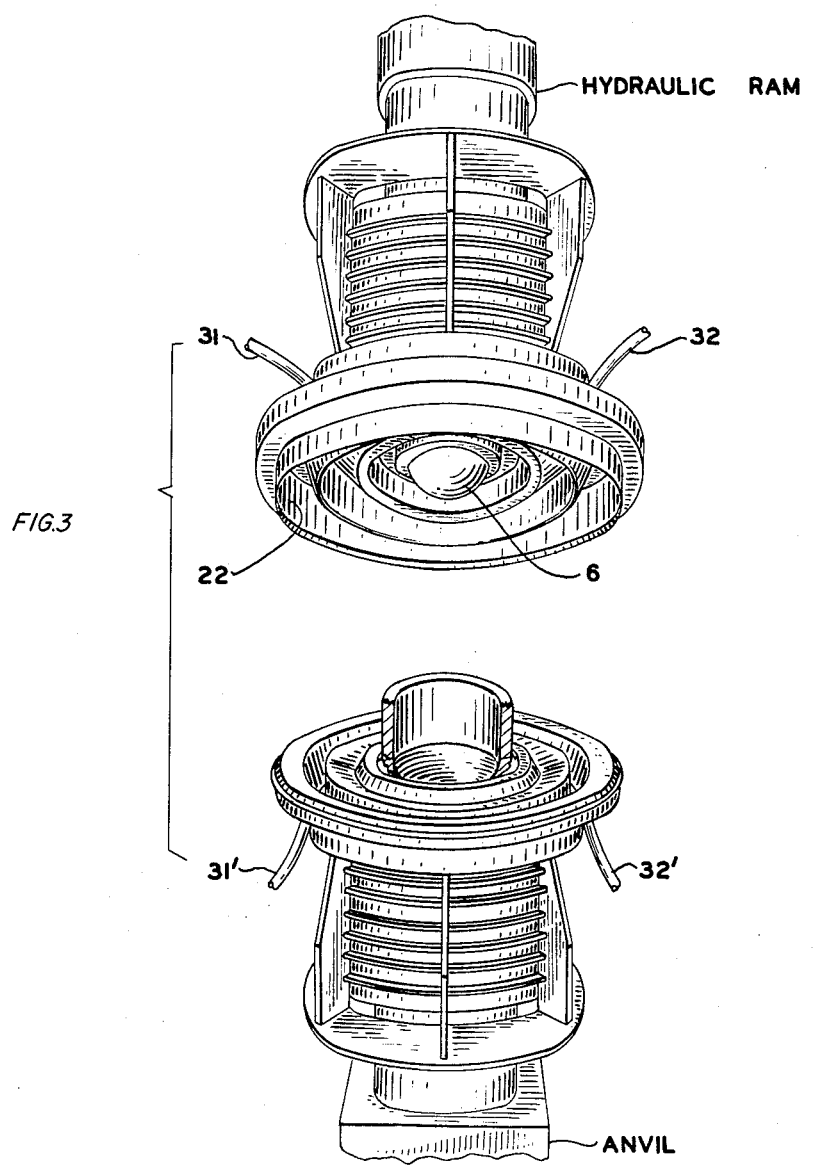

3,178,792
APPARATUS FOR HOT PRESSING
CERAMIC MATERIAL
Frederic B. B. Scott, Thistletown, Ontario, Canada,
assignor to Bausch & Lomb Incorporated, Rochester, N.Y., a corporation of New York
Filed Mar. 1, 1963, Ser. No. 262,173
1 Claim. (Cl. 25—45)

This invention relates to apparatus for hot pressing ceramic materials and more particularly to apparatus for manufacturing infrared transmitting elements from pulverulent magnesium fluoride.

The production of infrared transmitting windows and other optical elements made from hot pressed pulverulent magnesium fluorides are of increasing importance. Such elements are generally characterized by relatively high transparency to infrared radiation and are often capable of relatively high transmission of radiation having wavelengths up to about 30 microns. Articles of this type may be produced by the methods disclosed and claimed in the copending application of Eugene Letter, Serial No. 59,495, filed September 30, 1960, now Patent No. 3,114,601 and assigned to the same assignee as the present application.

The aforementioned methods have been found to be very desirable, however, apparatus for carrying out such methods is relatively cumbersome. The use of the relatively cumbersome apparatus is time consuming and even though the methods have the potential of being carried out in a relatively short time, a faster time cycle was unobtainable. For example, hot pressing at pressures of 5000 to 30,000 pounds per square inch at a temperature of 625° C. in a vacuum furnace required a substantial amount of time for assembling and disassembling the apparatus. The total time required for each cycle including placing the material in the die and removing the finished article was approximately four hours.

Apparatus according to the present invention is relatively compact i.e. in the area around the die. The time required for completing a cycle has been substantially reduced even though the time for heating and pressing remains approximately constant. Cycle time as used herein relates to the total cycle, i.e. the time consumed for each article including the time for assembling the apparatus, raising the temperature, obtaining a suitable vacuum and pressure, and disassembling the apparatus in order to remove the finished article. The present apparatus facilitates loading and unloading the die and tends to minimize the time required for obtaining a satisfactory vacuum. One feature of the invention further facilitates removal of a finished article without damaging the article. In actual practice the use of the new apparatus increased the output by a factor of 4.

Briefly, the apparatus according to the present invention comprises a two part die including mating members. The mating members define a cavity and a fluid chamber in restricted communication with the cavity when the members are brought together. A pair of induction coils are disposed adjacent to the separate members and adapted to raise the temperature of the members. Fluid pressure reducing means such as a vacuum pump are provided for evacuating the fluid chamber and means such as a hydraulic ram are provided for forcing the members together to thereby compress the material while the fluid chamber is under reduced pressure and the respective members are being heated.

The invention will now be described in more detail in connection with the accompanying drawings; in which, FIG. 1 is a cross sectional view of the apparatus according to the present invention in which, the apparatus is shown in an open position;

FIG. 2 is a cross sectional view of the apparatus according to the present invention in which, the apparatus is in a closed position; and, FIG. 3 is a perspective view illustrating the apparatus shown in FIGS. 1 and 2.

Generally a two part die includes a pair of mating members 4, 4'. The members 4, 4' are relatively massive units which are fabricated from an iron-nickel-cobalt alloy such as "Inconel-X." The alloy is used in view of its hot strength, which is sufficient to withstand sustained usage, at temperatures reaching approximately 650° C., and pressures in the range of 20,000 to 30,000 p.s.i.

The top member 4 which comprises the male portion of the die includes a convex portion 6. The portion 6 has a generally spherical shape. The shape defines a partial convex sphere which protrudes from a generally right cylindrical portion 8. The cylindrical portion 8 has a diameter which is larger than the diameter of the spherical portion 6. The cylindrical portion 8 also defines a recess 10 which extends upwardly into the member 4. The recess extends upwardly approximately ⅓ of the distance through the member 4. There is also a slight reduction in the diameter of the cylindrical portion 8 at the portion 8'. The portion 8 acts as a wiper for forcing the powder into a cavity 6' while the reduced portion 8' tends to minimize the abrasive action of any powder which slips past the portion 8. The opposite side 5 of the member 4 is fixed to a ram 12 by means of an assembly 14.

The member 4' includes means defining the concave portion 6' which has a generally spherical shape. The spherical shape of the portion 6' is larger than the convex portion 6 and has a diameter approximately equal to the diameter of the cylinder 8. The spherical portion 6' terminates in a conical section 7 which has a shape generally similar to a frustum of a cone. The cone has a draft angle of approximately 60° which is tangent to the spherical portion at the common point where the two portions come together. This arrangement has been found desirable for facilitating removal of a finished article. The portions 6, 6', 7 and a flat portion 8' of the cylinder 8 define a dome shaped die cavity. The opposite side of the member 4' is fixed to a ram 12' by an assembly 14' in a manner which is similar to the arrangement of the member 4, ram 12 and assembly 14.

Each of the members 4, 4' include an annular member 20, 20' which together define a fluid chamber when the mating members 4, 4' are in a closed position. The fluid chamber defines a labyrinth which is closed at the outer periphery of the member 20' and an inner side 21 of a downwardly extending portion 22 of the member 20. The configuration of the labyrinth shown in the drawing has been found particularly desirable. The particular configuration tends to prevent the loss of a vacuum seal caused by distortion due to a temperature differential between the outer edge of the ring and the center of the die. An O-ring seal forms the closure between the mating members.

The downwardly extending portion 22 acts as a closure prior to the time the mold is closed. This feature enables a vacuum to be drawn prior to the complete closing of the mold. The portion 22 also supports a vacuum manifold 23 which extends around the outer periphery of the portion 22 and is interconnected to the labyrinth by a passageway 24. The manifold 23 is connected by a pipe 25 to a source of reduced pressure 26.

Each of the members 20 and 20' also include a water manifold 30, 30' respectively for cooling the area adjacent the vacuum seal. The manifolds 30, 30' are connected to the pipes 31, 31' and 32, 32'. The pipes 31, 31' are water inlets and are connected to a source of water not shown. Pipes 32, 32' are outlets for the cooling liquid. These pipes are secured to the members 20 and 20' respectively by water closure rings 40, 40', 41 and 41'. The member 4' also includes a pair of wells 45, 46 which are adapted to receive thermal couples 45', 46' for measuring and controlling the temperature of the member 4'. The member 4 also includes a thermocouple well 47 for receiving a thermocouple 47' which is provided for controlling and measuring purposes.

A guide ring 50 is associated with the member 4' and receivable on top of the cone shaped portion 7 above the spherical cavity 6'. The inner diameter of the ring 50 is approximately equal to the diameter of the top of the cone 7. The inner diameter of the ring 50 is also approximately equal to the diameter of the cylinder 8 which is adapted to pass through the ring 50 in sliding contact with the ring 50. This portion acts as a wiper for forcing powder into the cavity 6. The ring 50 confines a mass of pulverulent powder which is compacted by the members 4, 4' when the portion 6 forces the material downwardly into the cavity 6'.

A pair of induction heating coils 60, 60' circumscribe the elements 4, 4' respectively. The coils 60, 60' are connected in series with a power supply for the induction coil. The series connection is shown schematically by the leads 61, 61' and 62. A pair of heat shields 70, 70' are composed of annular flanges which separate the coils 60, 60' from the members 20, 20' in order to prevent overheating of the vacuum manifold. These flanges may be metal which are welded to the members 4, 4', however, are preferably separated from the members 4, 4' by a dielectric. It is also desirable to include a pair of dielectric rings 71, 71', 72, and 72' above and below the metal rings 70, 70'.

The massive size of the members 4, 4' between the coils and the die cavity has been found desirable for obtaining a uniform temperature gradient across the surfaces defining the die cavities.

Another desirable feature of the present invention relates to the heat barriers 80, 80', 81, and 81'. These barriers are located between the rings 20, 20' and members 4, 4' respectively. These barriers tend to reduce the heat transfer from the members 4, 4' to the vacuum seal. A heat barrier 85 which comprises an annular groove is provided in the side 5 of the member 4 to reduce the heat transfer to the hydraulic ram.

What is claimed is:

Apparatus for hot pressing ceramic material comprising in combination a two part die including mating members, a first of said mating members defining a partial sphere and the second of said members defining a cavity having a shape generally similar to a partial sphere but larger than the sphere of the first of said mating members whereby said mating members define a dome shape cavity when in a closed position, a fluid chamber in restricted communication with the cavity defined by said members, fluid pressure reducing means connected to said fluid chamber and adapted to evacuate said fluid chamber, a pair of induction coils, each of said coils disposed adjacent to a separate one of said members and adapted to raise the temperature of the respective member, an O-ring seal separating said mating members and sealing said cavity from the outside atmosphere, cooling means disposed in close proximity to said O-ring and a pair of heat baffles disposed between the induction coils and the O-ring seal for maintaining a relatively low temperature while said members are heated, and means forcing said members together to thereby compress the material while the fluid chamber is under reduced pressure and the respective members are being heated.

References Cited by the Examiner

UNITED STATES PATENTS

| | | | |
|---|---|---|---|
| 1,541,357 | 6/25 | Johnson. | |
| 2,305,433 | 12/42 | Kyle | 18—16.5 |
| 2,386,604 | 10/45 | Goetzel | 18—16.5 |
| 2,393,130 | 1/46 | Toulmin | 18—16.5 XR |
| 2,415,462 | 2/47 | Cherry et al. | 19—16.5 XR |
| 2,437,127 | 3/48 | Richardson | 18—16.5 XR |
| 2,772,012 | 11/56 | Crabtree. | |
| 2,907,070 | 10/59 | Van Hartesveldt. | |
| 3,055,058 | 9/62 | Van Hartesveldt. | |

ROBERT F. WHITE, *Primary Examiner.*